(12) United States Patent
Harada

(10) Patent No.: US 8,089,485 B2
(45) Date of Patent: Jan. 3, 2012

(54) METHOD FOR CONSTRUCTING DATA STRUCTURE USED FOR PROXIMATE PARTICLE SEARCH, PROGRAM FOR THE SAME, AND STORAGE MEDIUM FOR STORING PROGRAM

(75) Inventor: Takahiro Harada, Toride (JP)

(73) Assignee: Prometech Software, Inc., Tokyo (JP)

( * ) Notice: Subject to any disclaimer, the term of this patent is extended or adjusted under 35 U.S.C. 154(b) by 993 days.

(21) Appl. No.: 12/071,133

(22) Filed: Feb. 15, 2008

(65) Prior Publication Data

US 2009/0021518 A1    Jan. 22, 2009

(30) Foreign Application Priority Data

Jul. 17, 2007 (JP) ................................ 2007-185978

(51) Int. Cl.
*G06F 15/00* (2006.01)
*G06F 19/26* (2006.01)

(52) U.S. Cl. ...................................................... 345/501
(58) Field of Classification Search .................. 345/501, 345/694
See application file for complete search history.

(56) References Cited

U.S. PATENT DOCUMENTS

| 7,190,363 B2 | 3/2007 | Guest et al. | |
| 7,215,340 B2 * | 5/2007 | Pfister et al. | 345/582 |
| 2006/0274085 A1 * | 12/2006 | Cook | 345/620 |

FOREIGN PATENT DOCUMENTS

| KR | 10-2005-0042916 A | 5/2005 |
| KR | 10-2006-0085110 A | 7/2006 |

OTHER PUBLICATIONS

Nathan A. Carr et al. The Ray Engine, 2002, Graphics Hardware 2002, pp. 1-10.*
Amada Takashi et al.,Particle-based fluid simulation on gpu. In 2004 ACM Workshop on General-Purpose Computing on Graphics Processors.*
Masayuki Tanaka et al.. Rigid body simulation using a particle method. In ACM SIGGRAPH 2006 Research posters (SIGGRAPH '06). ACM, New York, NY, USA, Article 132.*
A. Kolb et al., Hardware-based simulation and collision detection for large particle systems. In Proceedings of the ACM SIGGRAPH/EUROGRAPHICS conference on Graphics hardware (HWWS '2004). ACM, New York, NY, USA, 123-131.*
Tanaka et al., "Development of a rigid-body calculation method using a particle method, and application thereof to computer graphics," *Japan Society of Mechanical Engineers, Papers of the $19^{th}$ Computational Mechanics Conference*, pp. 701-702 (2006).

(Continued)

*Primary Examiner* — Javid Amini
*Assistant Examiner* — Fikru Gennene
(74) *Attorney, Agent, or Firm* — Oliff & Berridge, PLC

(57) ABSTRACT

A method for constructing a data structure of a proximate particle search is executed by a GPU, and computes a simulation of a physical object by converting three-dimensional digital image data to two-dimensional digital image data. The memory for a bucket is composed of buckets for dividing a memory space that is created in accordance with a space in which the physical object occurs. A writing step is provided in which a scattering function (GPU: vertex shader) is used by the GPU to read a particle coordinate and the particle number of a particle stored in the bucket and write the particle coordinate and the particle number to a two-dimensional image space.

7 Claims, 9 Drawing Sheets

OTHER PUBLICATIONS

Carr et al.; "The Ray Engine;" *Graphics Hardware*; 2002; pp. 1-10.

Jan. 26, 2011 Office Action issued in German Patent Application No. 10 2008 031 526.5 (with translation).

Harada, Takahiro et al, "Smoothed Particle Hydrodynamics on GPUs" Article corresponds to a lecture given at the conference "Computer Graphics International 2007" in Rio De Janeiro (May 30, 2007-Jun. 2, 2007).

Harris, Mark J. et al, "Simulation of Cloud Dynamics on Graphics Hardware" Proceedings of the ACM SIGGRAPH/EUROGRAPHICS conference on Graphics Hardware 2003; pp. 92-101 and 134.

Kipfer, Peter et al, "UberFlow: A GPU-Based Particle Engine" Proceedings of the ACM SIGGRAPH/EUROGRAPHICS conference on Graphics Hardware 2004; pp. 115-122 and 149.

* cited by examiner

METHOD FOR CONSTRUCTING DATA STRUCTURE USED FOR PROXIMATE PARTICLE SEARCH, PROGRAM FOR THE SAME, AND STORAGE MEDIUM FOR STORING PROGRAM

BACKGROUND OF THE INVENTION

1. Field of the Invention

The present invention relates to a method for constructing a data structure used for a proximate particle search, whereby a method is obtained for accelerating a proximate particle search by conclusively executing a particle-based simulation using a GPU or other streaming processors, and collision calculation or the like of numerous rigid bodies, for example, can be performed in real time; to a program of the method for constructing a data structure; and to a storage medium for storing the program.

2. Description of the Related Art

A "particle-based simulation" is a simulation method for performing calculations relating to the behavior of each of a large number of particles, in which the object of the simulation is a group (aggregation) of numerous particles. "Spheres" having a constant diameter are usually used as the particles for calculation by computer. When the shape of the object is expressed by an aggregation of spheres, the degree of approximation or the spatial resolution varies depending on the method of determining the size (diameter) of the spheres. Varying the sphere diameter and varying the spatial resolution make it possible to control the calculation accuracy and the calculation speed in the computer simulation calculation.

The abovementioned particle-based simulation has been used in recent years to calculate collisions of numerous rigid bodies, and to calculate the behavior of fluids, particulate bodies, and the like, and to research simulations of collisions, flow, and the like on the screen of a computer display device (Non-patent Document 1 and other publications). The results of this research are described in M. Tanaka et al., "Development of a rigid-body calculation method using a particle method, and application thereof to computer graphics," Japan Society of Mechanical Engineers, Papers of the 19th Computational Mechanics Conference, pp. 701-702, 2006. Research of these simulation techniques is important for the technology that forms the foundation of computer graphics (CG).

In the particle-based simulation research described above, numerous methods have been used in the past for utilizing a CPU to create a calculation algorithm. However, little research has been done concerning particle based simulations in which a GPU (Graphics Processing Unit) or a streaming processor is actively utilized. In such past research using a GPU, a proximate particle search was executed by a CPU, and the search data obtained by the CPU was transferred to the GPU for image processing. According to this technique, the CPU is used as the primary calculation execution unit, the calculation algorithm of the proximate particle search is executed by the CPU, and the GPU as an auxiliary calculation execution unit executes only a calculation algorithm for image display processing. Consequently, the conventional calculation technique was not configured so that the calculation algorithms of the proximate particle search and the image processing in the particle-based simulation are concluded and executed only within the GPU.

Since a configuration in which all calculation (image processing, construction of the data structure used in the proximate particle search, and the like) is concluded only by the GPU is not adopted in the conventional particle-based simulation calculation, the computational efficiency is unsatisfactory, the inherent image processing capability of the GPU cannot be adequately demonstrated, and it is impossible to perform collision calculation of numerous rigid bodies and other real-time rigid body simulations, fluid simulations, and the like. There is therefore a need to develop a method for conclusively utilizing a GPU or other steaming processor to execute construction of a data structure used in a proximate particle search by the GPU or the like, and demonstrating the maximum image processing capability of the GPU.

SUMMARY OF THE INVENTION

In view of the abovementioned problems, an object of the present invention is to provide a method for constructing a data structure used in a proximate particle search whereby construction of the data structure used in the proximate particle search of a particle-based simulation can be concluded by a GPU or other streaming processors, the GPU or the like can be efficiently utilized, the maximum (image) processing capability of the GPU can be demonstrated, high-speed calculation can be enabled, and computational processing/display processing can be performed, for example, for a real-time rigid body simulation, fluid body simulation, or the like; and to provide a program for the data structure construction method, and a storage medium for storing the program.

In order to achieve the abovementioned objects, the method for constructing a data structure used in a proximate particle search, the program thereof, and the storage medium for storing the program according to the present invention are constituted as described below.

The method for constructing a data structure is used by a method executed by a graphics computation processor such as a GPU or the like for computing a simulation of a physical object by converting three-dimensional digital image data constructed from image data created in video memory to two-dimensional digital image data, wherein the physical object is indicated as numerous particles, and a method is used for determining an existence state of the physical object on the basis of a storage positional relationship between the numerous particles in a three-dimensional image data structure in the video memory. A bucket texture included in the three-dimensional image data structure is composed of a bucket in which a memory space created in accordance with a space in which in the physical object occurs is divided, and a particle number assigned to the numerous particles is stored in each of numerous buckets; and a writing step is provided in which a particle coordinate and the particle number of the particle stored in the bucket are read and written to a two-dimensional image space using a vertex shader (e.g., scattering operation) by the graphics computation processor (e.g., stream processor). In the writing step, the particle number and particle coordinate of each of the plurality of particles are written one at a time in a rendering (such as in a kernel, for example) for a plurality of cycles of processing in a single time step of a simulation when a plurality of the particles is present in the bucket.

In the abovementioned method for constructing a data structure, selection of a memory location (GPU: written pixel) and a particle number of the particle written in each step (GPU: rendering) for the plurality of cycles of processing, and selection of a memory location in the memory for the voxel (GPU: channel in the written pixel) are performed using one or more counters (GPU: functions of a stencil test, a color mask, and a depth test that are prepared by the graphics computation processor). When a graphics computation processor is used, a counter may be realized by using a stencil text, a color mask, and a depth test which may be available on the GPU, for example.

In the abovementioned method for constructing a data structure, a particle number is sequentially stored from particle numbers that are in ascending order or descending order separately for each of four channels composed of RGBA of a pixel for which the particle number is written when four of said particles are present in the bucket.

The abovementioned method for constructing a data structure comprises: writing a particle number $i_{b0}$ in the R channel and performing rendering for a first routine by initializing a depth buffer at a maximum value, and accepting items having a small value using a depth test in writing to the pixel in a first pass; writing a particle number $i_{b1}$ in the G channel and performing rendering for a second routine by using a color mask to prohibit writing to the R channel, and using a stencil test in writing to the pixel in a second pass; writing a particle number $i_{b2}$ in the B channel and performing rendering for a third routine by using a color mask to prohibit writing to the R and G channels, and using a stencil test in writing to the pixel in a third pass; and writing a particle number $i_{b3}$ in the A channel and performing rendering for a fourth routine by using a color mask to prohibit writing to the R, G, and B channels, and using a stencil test in writing to the pixel in a third pass; the particle numbers of the four particles being $i_{b0}$, $i_{b1}$, $i_{b2}$, and $i_{b3}$ (wherein $i_{b0} < i_{b1} < i_{b2} < i_{b3}$).

In the abovementioned method for constructing a data structure, the physical object is composed of numerous rigid bodies, and computation of a simulation based on collision calculation of the numerous rigid bodies is executed.

In the abovementioned method for constructing a data structure, the graphics computation processor is a GPU or a streaming processor.

The program for constructing a data structure used in a proximate particle search according to the present invention is a program for executing the routines and the like that constitute the proximate particle search method described above by a graphics computation processor.

The following effects are obtained by the present invention.

In a method for simulating a physical phenomenon on a computer by applying a particle-based simulation to approximate a rigid body, a fluid body, a particulate body, or the like and implementing a method for constructing a data structure used in a proximate particle search, a configuration is adopted in which the routines for executing calculations for constructing the data structure used in the proximate particle search are completed by a GPU or other streaming processor, the GPU or the like is efficiently utilized, the maximum image computation processing capability of the GPU can be demonstrated, and high-speed calculation can be performed, whereby a real-time rigid-body simulation, fluid-body simulation, or the like, for example, can be performed.

The present invention can also be utilized as an important elemental technology that is optimal for a game or the like in which flowing water and other natural objects are expressed by utilizing a rigid-body simulation, a fluid-body simulation, or the like in an image display as a simulation CG.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

Figure 1:
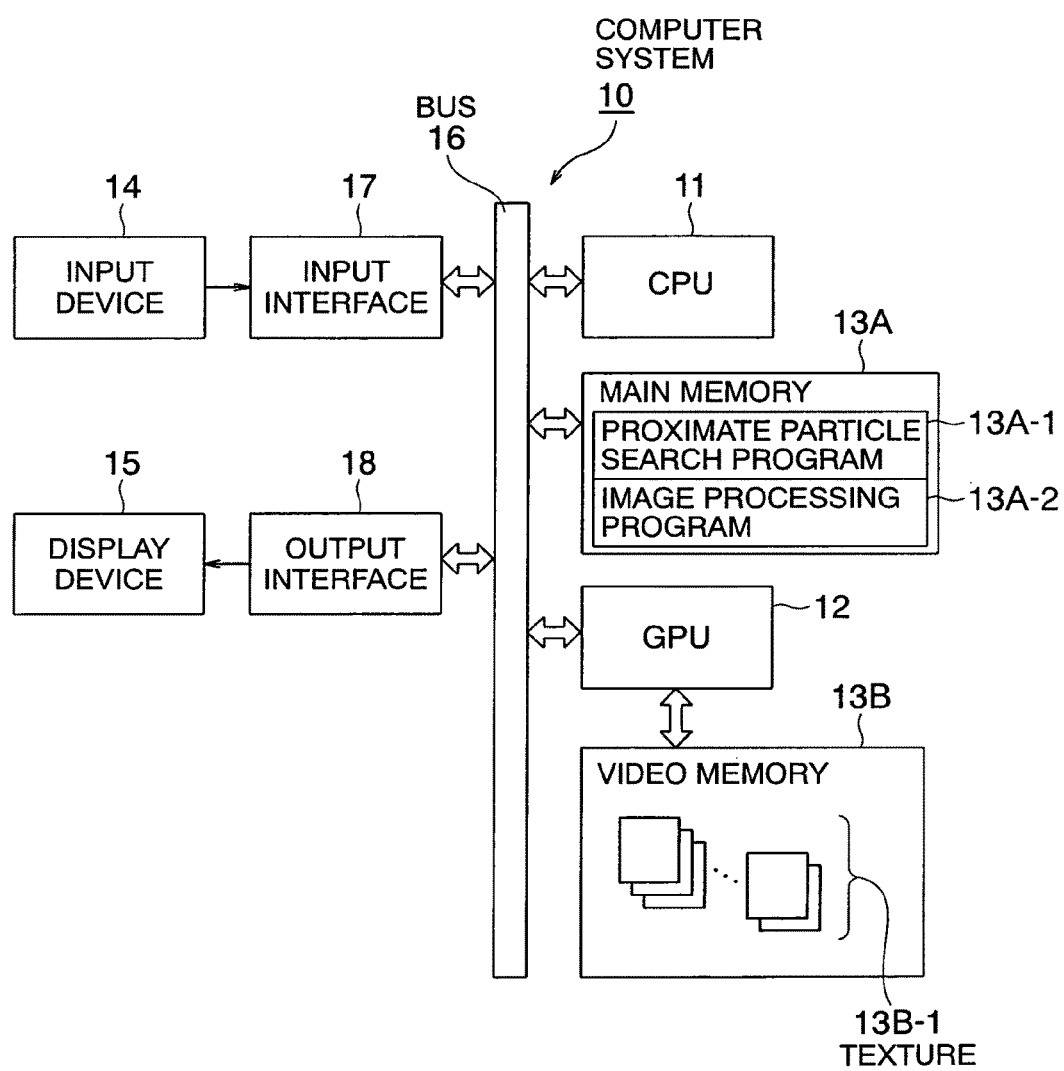
FIG. 1 is system structure diagram showing the basic structure of the computer system for implementing the method for constructing a data structure used in a proximate particle search according to the present invention.

Preferred embodiments of the present invention will be described hereinafter based on the accompanying drawings. FIG. 1 shows the basic structure of the computer system for implementing the method for constructing a data structure used in a proximate particle search according to the present invention.

The computer system 10 is configured using a PC (Personal Computer), for example, and is provided with a CPU 11 and a GPU 12 as computational processors. The computer system 10 is also provided with main memory 13A and video memory (VRAM) 13B as storage devices, and is provided with at least an input device 14 and a display device 15 as peripheral devices. The CPU 11, GPU 12, main memory 13A, input device 14, and display device 15 are connected to each other via a bus 16. The input device 14 is connected to the bus 16 via an input interface 17, and the display device 15 is connected to the bus 16 via an output interface 18. The video memory 13B is directly connected to the GPU 12. Data are exchanged with the video memory 13B through the GPU 12.

The CPU (central computational processing device) 11 is a common computational processor installed in a PC or the like, for example. The GPU (Graphics Processing Unit) 12 is a "graphics computational processor," and executes image computational processing. The GPU 12 is used as a parallel calculation device composed of a plurality of internally housed processors. An Nvidia "GeForce 7900GTX," for example, is used as the GPU 12. The product used as the GPU 12 is not limited as such, and a processor or other streaming processors for I mage processing that has a similar structure/functions may also be used. The GPU 12 executes a proximate particle search program 13A-1 stored in the main memory 13A and implements a proximate particle search computation in a particle-based simulation. The proximate particle search program 13A-1 executes construction of a data structure used in a proximate particle search. The GPU 12 also executes a common image processing program 13A-2 stored in the main memory 13A, implements image processing using image data stored in pixels that are obtained by calculation of the proximate particle search, and uses the created image data to draw (render for display) on the screen of the display device 15. A CG image is displayed on the screen of the display device 15 on the basis of the particle-based simulation calculations.

In the description of the present embodiment given hereinafter, computation of a real-time rigid-body simulation is described that is based on executing collision calculations of numerous rigid bodies on the basis of the particle-based simulation. In the computation of this simulation, the method for constructing the data structure for use in the proximate particle search is executed solely by the GPU 12.

Figure 2:
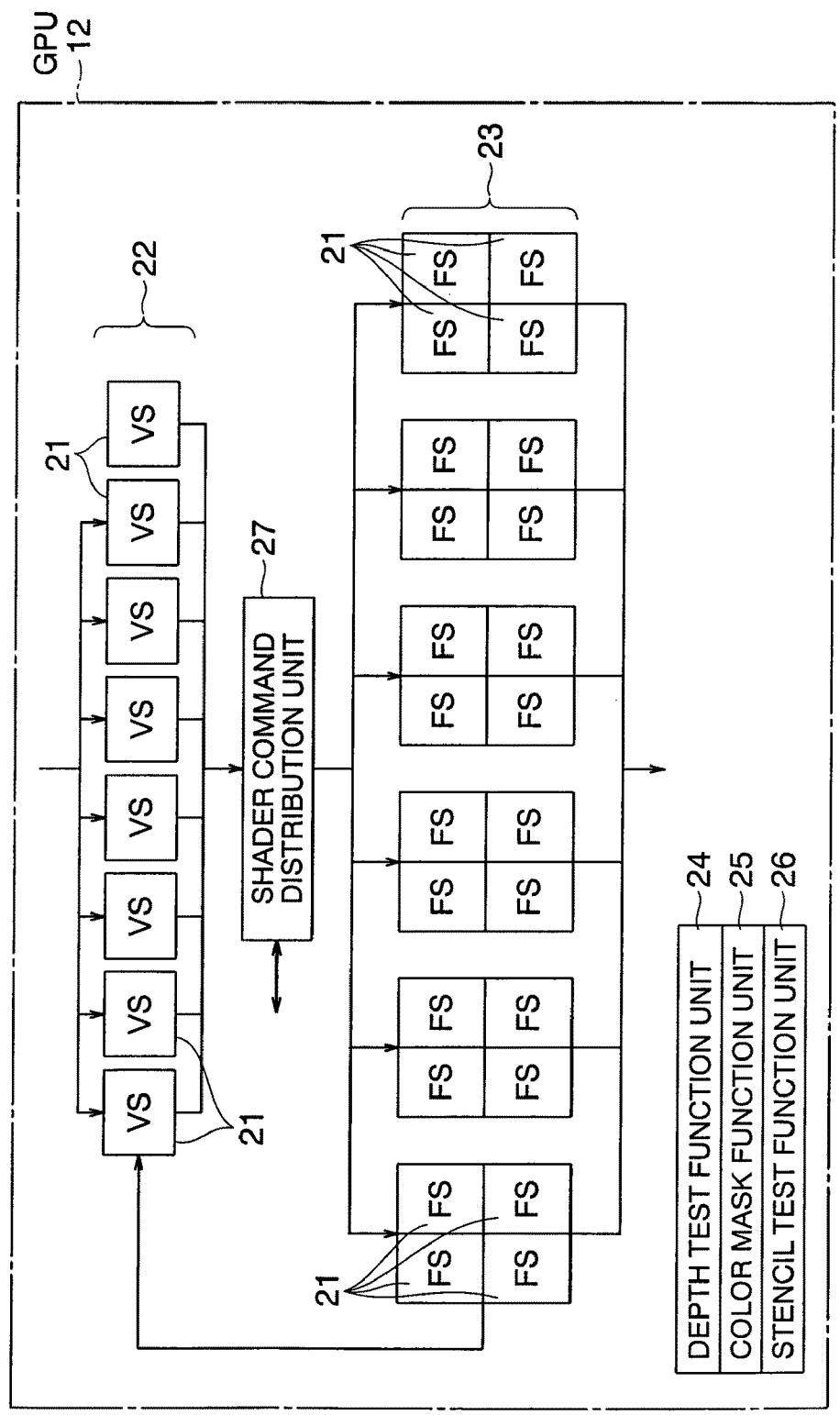
FIG. 2 is a block diagram showing the basic structure of the inside of the GPU installed in the computer system.

The basic structure of the relevant parts of the inside of the aforementioned GPU 12 is schematically shown in FIG. 2. The GPU 12 is provided with a plurality of processors 21 arranged in parallel fashion, and rendering for display (drawing) is executed based on the parallel calculation processing by the processors. According to the method for constructing (bucket construction) the data structure used in a proximate particle search according to the present embodiment in particular, when four particles, for example, are present in a single bucket, the particle numbers and particle coordinates of the four particles are written to each of the channels RGBA of a single pixel in four repeated renderings for processing. The image computation processing is accelerated through the bucket construction processing in the GPU 12. More specifically, when the GPU 12 is a "GeForce 7900GTX," the GPU 12 has eight vertex shaders (VS) 22 arranged in parallel in a first stage, and 24 fragment shaders (FS) 23 arranged in parallel in a subsequent stage. The program executed by the vertex processors (21) is a vertex shader 22, and the program executed by the fragment processors (21) is a fragment shader 23.

In the above description, the vertex processors are processors arranged in parallel, and are processors that are specialized for simultaneously processing coordinate conversion (conversion of inputted vertex coordinates to coordinates in the space of the rendered image) of numerous vertexes. The GPU 12 can calculate vertex coordinate conversion at high speed in comparison to a CPU. The operation of a vertex processor is specified by a vertex shader.

The GPU 12 is furthermore provided with a depth test function unit 24, a color mask function unit 25, and a stencil test function unit 26. The block 27 is a shader command distribution unit.

The proximate particle search program 13A-1 for executing the method for constructing a data structure used in a proximate particle search according to the present invention is conclusively executed solely by the GPU 12 using the abovementioned internal structure of the GPU 12.

An embodiment of the rigid-body simulation of the collisions of numerous rigid bodies will next be described. The details of the method for constructing a data structure used in a proximate particle search that is implemented based on execution of the proximate particle search program 13A-1 will become apparent through this description of the rigid-body simulation.

Figure 3:
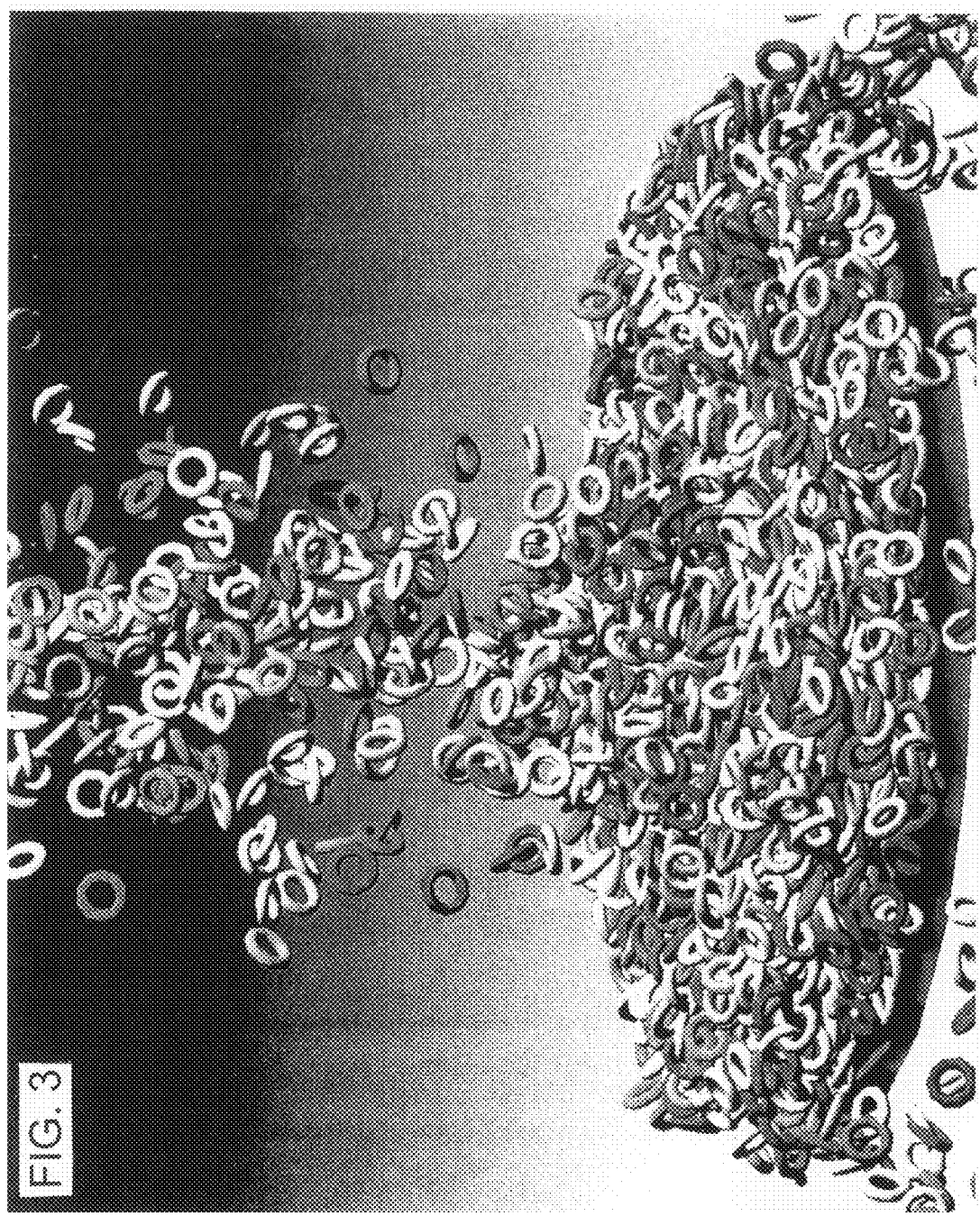
FIG. 3 is a diagram showing an effect image (CG) based on a rigid-body simulation relating to the physical phenomenon of falling/collisions of 10,922 tori.
Figure 4:
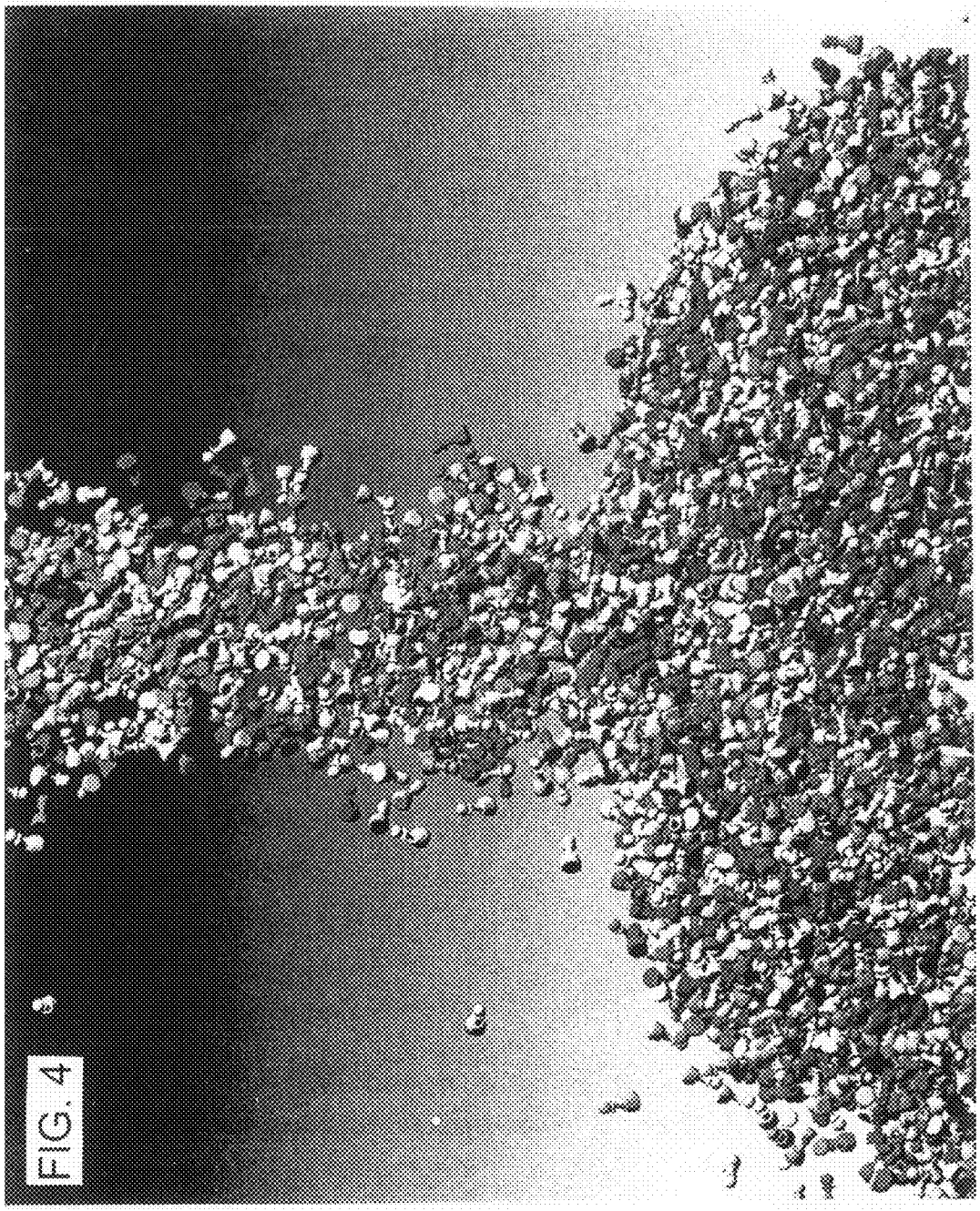
FIG. 4 is a diagram showing an effect image (CG) based on a rigid-body simulation relating to the physical phenomenon of falling/collisions of 16,384 chess pieces.

Examples of the numerous rigid bodies include numerous torus members or numerous chess pieces. Examples of the CG obtained as results of the rigid-body simulation of the present embodiment are shown in FIGS. 3 and 4. FIG. 3 shows an effect image (CG) based on collision calculation of a rigid-body simulation relating to the physical phenomenon of falling/collisions of 10,922 tori; and FIG. 4 shows an effect image (CG) based on collision calculation of a rigid-body simulation relating to the physical phenomenon of falling/collisions of 16,384 chess pieces.

In the collision calculations of numerous rigid bodies described above, the shapes of the numerous rigid bodies are all expressed and treated in approximate fashion as aggregations of same-sized spheres (particles) by applying a particle-based method (particle-based simulation). The shapes of the rigid bodies based on spheres are approximated based on a polygon model of the rigid bodies, and are generated using a voxelization method using a GPU ("Fast solid voxelization using graphics hardware," Transactions of JSCES, p. 20060023, 2006) that has been proposed by the present inventors and others, for example. The size of the spheres used (spatial resolution) is appropriately determined with consideration for the calculation accuracy and calculation speed.

In the collision calculation of numerous rigid bodies in which the rigid bodies are approximately expressed as an aggregation of spheres, (1) calculation of each rigid body, (2) detection processing (calculation of the distance between spheres that constitute the rigid bodies) of collisions between rigid bodies, and (3) response processing (calculation of force and torque that act on the sphere) based on the collision are executed. The concepts of these calculations are described below.

(1) Calculation of the Rigid Body:

The physical quantities required for calculation of a rigid body are the center-of-gravity coordinates, the translational speed, a quaternion indicating an amount of rotation, the angular speed, and the inertia tensor.

(Formula 1)
x: coordinates of center of gravity
v: translational speed
q: quaternion indicating the amount of rotation
w: angular speed
I: inertia tensor Calculation of the motion of the rigid bodies is divided into calculation of translational motion and calculation of rotational motion. The details of calculation of translational motion are shown in (Formula 2), and the details of calculation of rotational motion are shown in (Formula 3).

(Formula 2)

The force F acting on a rigid body is decomposed into the force Fc occurring due to collision, and the other external force Fe, as shown in Eq. (1).

$$F = Fc + Fe \quad (1)$$

The time differential of the translational motion amount P of a rigid body is calculated as shown in Eq. (2) using the force F acting on the rigid body.

$$dP/dt = F \quad (2)$$

The speed v of the center of gravity is calculated from P=Mv (wherein M is the mass of the rigid body) using the translational motion amount P. When the speed v of the center of gravity is used, the time differential of the center-of-gravity position x of the rigid body is indicated by Eq. (3).

$$dx/dt = v \quad (3)$$

(Formula 3)

The force F acting on a rigid body causes rotational motion of the rigid body, and changes the angular motion amount L. The time differential of the angular motion amount L is indicated by Eq. (4). F is the vector from the center of gravity of the rigid body to the action point of the force.

$$dL/dt = r \times F \quad (4)$$

The angular speed w is calculated by Eq. (5) using the angular motion amount L.

$$w = I(t)^{-1} L \quad (5)$$

In Eq. (5), $I(t)^{-1}$ is the matrix inverse of the inertia tensor at time t. The matrix inverse $I(t)^{-1}$ is calculated by Eq. (6) using the matrix inverse $I(0)^{-1}$ of the inertia tensor I(0) of the rigid body in the initial state.

$$I(t)^{-1} = R(t) I(0)^{-1} R(t)^T \quad (6)$$

In Eq. (6), R(t) and $R(t)^T$ are the rotation matrix and the transposed matrix at time t. The quaternion q is updated using the angular speed w calculated by Eq. (5). The change amount dq of the quaternion is calculated from the angular speed w by Eq. (7).

$$dq = [\cos(\theta/2), a \sin(\theta/2)] \quad (7)$$

The rotational axis a and the rotation angle θ herein are calculated by Eqs. (8) and (9).

$$a = w/|w| \quad (8)$$

$$\theta = |w dt| \quad (9)$$

The quaternion q(t+dt) after dt is calculated by Eq. (10) using q(t) at time t and dq of Eq. (7).

$$q(t+dt) = dq \times q(t) \quad (10)$$

(2) Collision Detection Processing:

The distance between the spheres that constitute a rigid body is calculated in order to detect a collision of a rigid body. Two spheres are considered to collide when the distance between the spheres is smaller than the diameter of the spheres. In detection of collisions between numerous rigid bodies, the abovementioned distance calculation must be performed in relation to the spheres that constitute all the rigid bodies. The amount of calculation is proportional to the square of the number of spheres, and as the number of rigid bodies increases, the number of spheres increases, and the amount of calculation also increases. Therefore, in order to reduce the amount of calculation in the configuration of the collision detection processing according to the present embodiment, an imaginary space (three-dimensional data storage space in memory) in which the numerous rigid bodies exist is divided into a grid (three-dimensional space grid) referred to as "buckets (or grids)," and numerous spheres that indicate the numerous rigid bodies, respectively, are stored in the buckets. A single bucket forms a single cube, and in a case in which a three-dimensional data structure is used in which the length of one side of a bucket is the same length as the diameter of a sphere, the spheres that can potentially collide with a certain sphere i are limited to the spheres that are stored in the $3^3$ buckets adjacent to the bucket in which the sphere i is stored. Collision detection is performed based on the construction of buckets as described above, whereby the amount of calculation is reduced, and the calculation cost can be markedly reduced. The details of bucket construction according to the present embodiment are described hereinafter.

(3) Response Based on Collision:

In a collision response, the force applied to the sphere that constitutes a single rigid body is calculated. In the calculation of the collision force, a linear spring and dashpot used in a distinct element method are used in relation to two spheres in contact with each other. The details of the collision force calculation are shown in (Formula 4).

(Formula 4)

A repulsive force proportional to the amount of indentation, and a damping force proportional to the relative speed act on colliding spheres, wherein κ is the spring coefficient, and η is the damping coefficient. When two spheres i and j are present, and the diameter thereof is d, a collision occurs when the distance |rij| between the two spheres is smaller than d, and the force fs due to elasticity according to Eq. (11), and the damping force fd due to damping according to Eq. (12) act on the spheres.

$$fs = -\kappa(d - |rij|) rij/|rij| \quad (11)$$

$$fd = -\eta(vj - vi) \quad (12)$$

According to Eqs. (11) and (12), rij=rj−ri, and ri and rj are the position vectors of the spheres i, j.

The frictional force ft in the shear direction is calculated by Eq. (13) as a force proportional to the speed vt in the shear direction.

$$ft = \kappa t vt \quad (13)$$

The force fi acting on the sphere i is calculated by Eq. (14).

$$fi = fs + fd + ft \quad (14)$$

The force Fc and the torque Tc acting on the rigid body due to collision are calculated by Eqs. (15) and (16), respectively, using the force fi acting on the sphere i.

$$Fc = \sum_{i \in rigidbody} fi \quad (15)$$

$$Tc = \sum_{i \in rigidbody} r'i \times fi \quad (16)$$

In Eq. (16), r'i is the relative position vector of a sphere with respect to the center of gravity of a rigid body.

Acceleration of the method for constructing a data structure or use in the proximate particle search on the basis of using only the GPU 12 will next be described. According to the present embodiment, the abovementioned calculations relating to collisions of the numerous rigid bodies are all performed by the GPU 12. The speed of the abovementioned calculations can thereby be increased. The calculation algorithm based on the proximate particle search program 13A-1 in the GPU 12 will be described.

The data structure prepared for the abovementioned calculation algorithm will first be described.

When the calculations described above are performed by the GPU 12, the aforementioned physical quantities are stored and retained as a plurality of textures 13B-1 (shown in FIG. 1) included in the video memory 13B.

Specifically, two textures 13B-1 stored in the video memory 13B are used for each of the center-of-gravity coordinate, the quaternion, the translational motion amount, and the angular motion amount of each rigid body in order to perform the rigid body calculation. A single texture 13B-1 stored in the video memory 13B is used for each of the center coordinate, the speed, the bucket, the force acting on each sphere, and the torque acting on each sphere for each sphere in order to perform the collision calculation.

In the case of the present embodiment, a three-dimensional space is assumed, and a three-dimensional space grid, i.e., bucket, into which the three-dimensional space is divided as described above is prepared in the collision calculation of the numerous rigid bodies that is based on the particle-based simulation. However, a three-dimensional texture cannot be written to by a GPU 12 that can currently be used. Therefore, in the present embodiment, a three-dimensional bucket composed of (L×L×L) grid numbers is expressed using a single two-dimensional texture formed by laying (D×D) of the necessary number of two-dimensional grids. In this case, when the indices on the three-dimensional bucket are (i, j, k), and the indices on the two-dimensional texture are (s, t), the relationships indicated by Eqs. (17) and (18) are formed between the two types of indices.

$$s=i+L(k-D[k/D])\qquad(17)$$

$$t=j+Lf[k/D]\qquad(18)$$

In the equations, i, j, k, and s, t are values included in the ranges [0, L−1] and [0, D×L−1], respectively.

The calculation algorithm of acceleration using the GPU 12 will next be described with reference to the flowchart in FIG. 5.

When the unit of time for performing one cycle of calculation (simulation) for drawing in the display screen of the display device 15 is a single time step, the calculation in the single time step is performed in the eight stages shown below.

Stage 1: Calculation of physical quantities of the spheres (step S11)
Stage 2: Bucket construction (step S12)
Stage 3: Collision detection (step S13)
Stage 4: Collision response (calculation of force and torque acting on the spheres) (step S14)
Stage 5: Calculation of the amount of translational motion of the rigid bodies (step S15)
Stage 6: Calculation of the amount of angular motion of the rigid bodies (step S16)
Stage 7: Calculation of the center-of-gravity coordinates of the rigid bodies (step S17)
Stage 8: Calculation of the quaternion of the rigid bodies (step S18)

Rendering processing for display is performed using the center-of-gravity coordinate and the quaternion of the rigid body that are ultimately obtained by the abovementioned calculations (simulation), and the result image of the simulation is drawn (step S19). A determination is made in a subsequent determination step S20 as to whether to continue the simulation, and when the result is YES, the process returns to step S11, and steps S11 through S19 are repeated. When the result is NO, the simulation is ended. As described above, the eight stages of the calculation steps S11 through S18 are executed in the time of a single time step for the rendering processing (step S19) for one cycle of display.

In the above description, the processing calculation of the proximate search is performed in the calculation of "bucket construction" executed in step S12. This calculation is conclusively executed solely by the GPU 12, whereby the calculation can be accelerated. A detailed description of bucket construction is given below.

The details of the calculations in steps S11 through S19 are described below.

Step S11: Calculation of Physical Quantities of a Sphere

The center-of-gravity coordinates and speeds of the spheres constituting the rigid bodies are calculated to perform collision calculation of the numerous rigid bodies by the particle method. The details of calculation relating to the speed and center-of-gravity coordinate of a sphere are as shown in (Formula 5).

(Formula 5)

The center-of-gravity coordinate, quaternion; speed, and angular speed of the rigid body j are Xj, Qj, Vj, and Wj, respectively.

When ri is the relative position vector of the center of the sphere i with respect to the center of gravity of the rigid body in a non-rotating state, the relative position and vector r'i in a state of rotation by the quaternion Qj are calculated by Eq. (19).

$$r'i=QjriQj^T\qquad(19)$$

When xi, vi are the center coordinate and the speed of the sphere i constituting the rigid body j, xi and vi are calculated by Eqs. (20) and (21).

$$xi=Xj+r'i\qquad(20)$$

$$vi=Vj+Wj\times r'i\qquad(21)$$

Step S12: Bucket Construction

The term "bucket construction" refers to processing for storing all the numbers of the numerous spheres (particles) prepared for expressing each of the numerous rigid bodies in three-dimensional space grids, i.e., buckets, prepared as elements into which space is divided as a data structure within the video memory 13B, as previously described. Specifically, bucket construction is the processing for storing a number assigned to each of the numerous spheres in each of numerous buckets, and is processing for scattering data relating to each of numerous spheres.

A writing function (rendering for processing) by a vertex (vertex) shader is used in the abovementioned processing relating to bucket construction. The writing function is a function whereby a vertex can be written in a coordinate that is designated as input. In other words, a vertex shader has a function referred to as a vertex texture fetch (VTF) for accessing a texture of the video memory 13B, and the coordinate of a sphere can be referenced through the use of this function of the vertex shader. The data dispersion processing described above can be performed in the GPU 12 by placing a vertex at the coordinate of the bucket that corresponds to the coordinate of the sphere.

When the number of spheres is n ($i_0, i_1, \ldots, i_{n-1}$), the name number n ($p_0, p_1, \ldots, p_{n-1}$) of vertexes as the number of spheres are prepared. A single sphere is correlated with each vertex. The numbers of the spheres that correspond to the vertexes $p_0, p_1, \ldots, p_{n-1}$ are $i_0, i_1, \ldots, i_{n-1}$. The sphere numbers are arranged in the order (ascending order) $i_0 < i_1 < \ldots < i_{n-1}$, for example. The arrangement of the spheres may also be in descending order.

Assuming the correlation described above, the vertex shader references the coordinates of all the spheres in the previous time step using the abovementioned vertex texture fetch (VTF), calculates the coordinates on the bucket texture on the basis of the coordinates, and outputs the number of the sphere of the coordinates, whereby the number of the sphere can be written to the bucket texture.

In the case of the processing described above, bucket construction can be performed correctly only when a single sphere is present within a bucket, whereas bucket construction cannot be correctly performed when multiple spheres are present within a single bucket. When there is a possibility that multiple spheres are present in a single bucket, the spheres must be stored one at a time in sequence in the bucket while the numbers of the number of spheres stored in the bucket are referenced in order to perform a correct bucket construction. Through the parallel processing used by the GPU 12, since a written sphere number cannot be reference in the rendering for one cycle of processing, only one number can be written in each bucket after the parallel processing. When four spheres are present in a single bucket, for example, since four vertexes are written in the same pixel, the number of a single sphere is ultimately written in the pixel.

In bucket construction according to the present embodiment, a configuration is adopted in which a plurality of spheres can be stored in a single bucket $b_j$. This method is described with reference to the flowchart in FIG. 6.

A case is considered herein in which a maximum of four spheres fit in the bucket $b_j$. The numbers of the four spheres are $i_{b0}$, $i_{b1}$, $i_{b2}$, and $i_{b3}$, and the values of the channels RGBA are each written in a single pixel. The numbers of the four spheres are arranged in order (ascending order) in which $i_{b0} < i_{b1} < i_{b2} < i_{b3}$. The numbers of the four spheres may also be in descending order. In bucket construction, the writing for one pixel is divided into four writings of sphere numbers, whereby the GPU 12 is also used when the maximum of four spheres are present in a single bucket. In other words, when four spheres are present in the bucket $b_j$, bucket construction is performed based on the GPU 12 by dividing the writing into four writings (renderings for processing) in a single time step.

In the aforementioned vertex shaders (VS) 22, the coordinate of the sphere that corresponds to a vertex is used to calculate the in-bucket coordinate of the coordinate, and the number of the sphere is transferred to the fragment shaders (FS) 23. In the fragment shaders (FS) 23, the number of the sphere is written as "color" or "depth."

Figure 6:
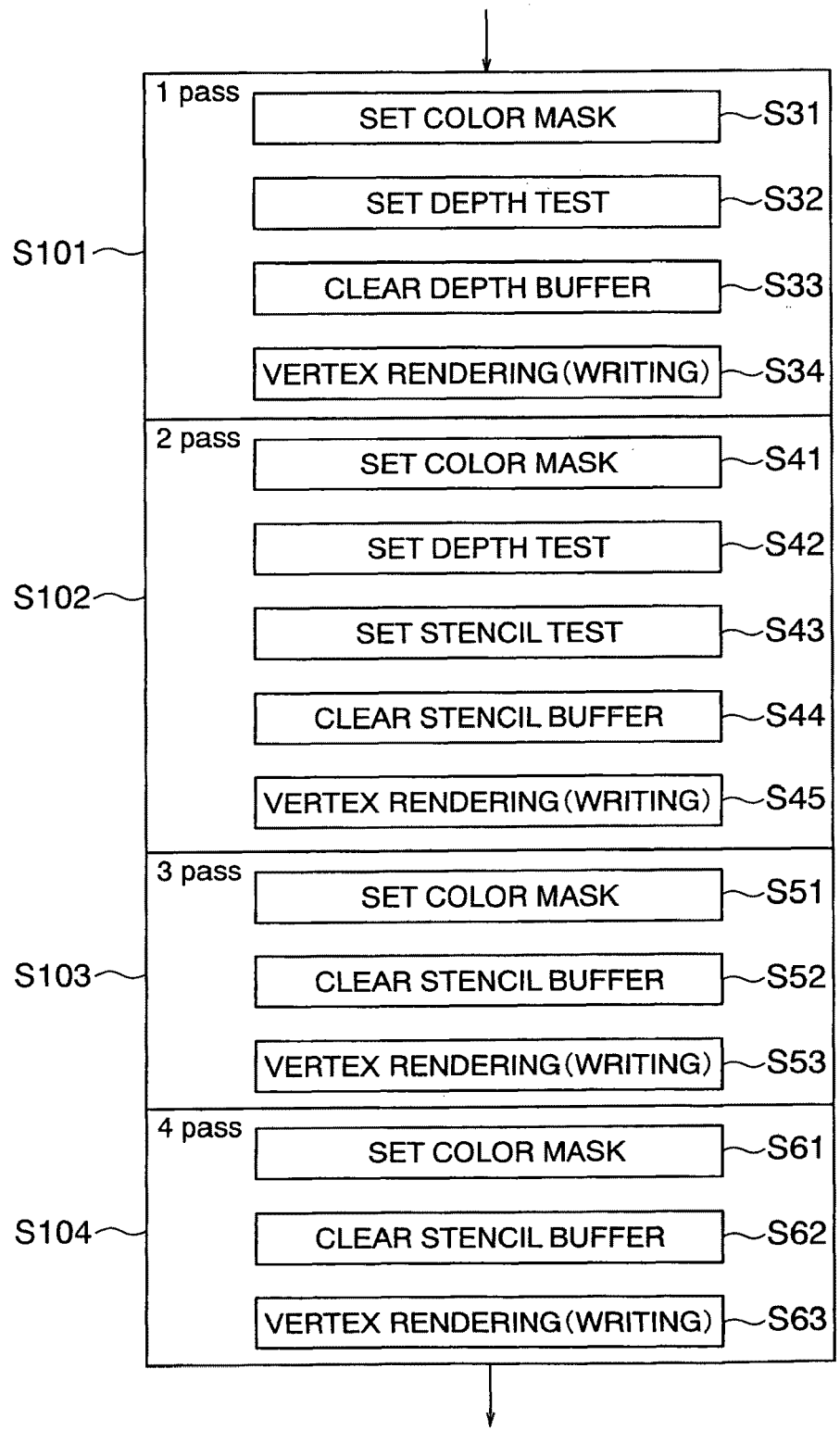
FIG. 6 is a flowchart showing the specific details of the processing routines of bucket construction.

The processing details of bucket construction S12 will be specifically described with reference to FIG. 6. The step of bucket construction S12 is composed of steps S101 through S104 of four passes that are performed in sequence.

The first write (step S101) to a single pixel in the first pass is a step for writing the sphere number $i_{b0}$ to the R channel. The sphere number $i_{b0}$ has the smallest number among the four spheres. Specifically, this sphere number is written as the pixel having the smallest depth, and rendering for the first processing is performed. In the case of writing this sphere number $i_{b0}$, a color mask for selecting the R channel is first set (step S31), a depth test is set (step S32), the depth buffer is then initialized to the maximum value (step S33), the depth test thus set is used to accept items having the smallest value, and writing (vertex rendering S34) is enabled.

Writing (step S102) to the same pixel in the second pass is a step for writing the sphere number $i_{b1}$ to the G channel so that the value written to the R channel is not overwritten. In this writing, writing to the channels RBA is prohibited through the use of a color mask for selecting the G channel (step S41). The same depth buffer as the one used in the first pass is used, and the depth test is set so as to accept items having a large value (step S42). However, since the largest sphere number $i_{b3}$ is thereby written to the G channel of the abovementioned pixel, a stencil test is used to prevent this writing (step S43). In the stencil test, the stencil buffer is initialized to zero (step S44), and a setting is made so that the value is increased by the stencil test. When the value is 1 or greater in the stencil test, a setting is made so that writing fails (step S43). A sphere number for which writing has failed is thereby prevented from being written to the pixel after write processing has been performed once for the pixel. The sphere number $i_{b1}$ is thus written to the G channel (step S45) in the second pass of writing to the same pixel.

The same processing as described above is then performed in the case of writing of the pixel number $i_{b2}$ to the B channel of the third pass (step S103), and writing of the sphere number $i_{b3}$ of the fourth pass (step S104) in the same pixel, and the sphere number $i_{b2}$ and the sphere number $i_{b3}$ are written to the B channel and the A channel, respectively. Step S103 of the third pass has the steps S51 through S53 of setting a color mask for selecting the B channel, clearing the stencil buffer, and vertex rendering (writing), respectively. Step S104 of the fourth pass has the steps S61 through S63 of setting a color mask for selecting the A channel, clearing the stencil buffer, and vertex rendering (writing), respectively.

As described above, in constructing the data structure used in the proximate particle search in which the GPU 12 is used, i.e., in bucket construction, in a case in which a plurality (four, for example) of spheres is present in a bucket, storage in the bucket (writing of sphere numbers to the channels RGBA of the pixel) is divided into rendering for a plurality (four, for example) of instances of processing when the numbers of the spheres are stored in a single bucket and correlated with a pixel. In the rendering for a single instance of processing, the number of a single sphere is written to a single channel of the pixel in accordance with the aforementioned rule. The aforementioned rule relating to selection of the write channels and the write order of the sphere numbers in each rendering is determined through the use of the depth test, the color mask, and the stencil test that are functions of the GPU 12.

Step S13: Collision Calculation

In this collision calculation, a search is performed for a sphere that is present in the vicinity where there is a possibility of collision with a certain sphere i. In this search, a bucket texture generated as a coordinate texture of the sphere is designated as input, and processing is performed using a fragment shader. Through this processing, a bucket is referenced, whereby the numbers of the spheres stored in the $3^3$ buckets surrounding the bucket in which the certain sphere is stored are obtained, and the numbers are used to reference the texture for which the coordinate of the sphere is stored, whereby the sphere coordinate (center coordinate of the sphere) are obtained. The distances between the spheres and the sphere i are calculated using the sphere coordinate of each sphere, and collision calculation is performed.

Step S14: Collision Response (Calculation of the Force and Torque Acting on the Spheres)

For two spheres that are determined to be colliding, the forces acting on the spheres, and the torques exerted on the rigid bodies by the forces can be calculated from Eq. (12) using the coordinates (positional vectors) of the two spheres, the speeds (velocity vectors) of the two spheres, and the relative positional vectors with respect to the centers of gravity of the rigid bodies.

Steps S15, S16: Calculation of the Amounts of Translational Motion and Angular Motion of the Rigid Bodies In step S14, since the forces acting on the spheres, and the torques exerted on the rigid bodies by the forces are calculated, these values are combined using the aforementioned Eqs. (15) and (16), and the forces acting on the rigid bodies are calculated. The amounts of translational motion and angular motion of the rigid bodies are then updated using the aforementioned Eqs. (2) and (4).

Steps S17, S18: Calculation of the Center-of-Gravity Coordinates and Quaternions of the Rigid Bodies The center-of-gravity coordinate of a rigid body is calculated using the aforementioned Eq. (3). In the present embodiment, output to another rigid body center-of-gravity coordinate texture is performed using the center-of-gravity coordinate and the center-of-gravity speed texture of the rigid body as input. Updating of the quaternions of the rigid bodes is calculated using the aforementioned Eq. (10). In the present embodiment, the value to which the other rigid body quaternion texture is updated is furthermore written using the quaternions and the angular speed textures of the rigid bodies as input.

Step S19: Rendering Processing (Rendering for Display)

Rendering for drawing the display on the screen of the display device 15 on the basis of the calculation shown in (Formula 6) below is performed using the center-of-gravity coordinates and quaternions of the rigid bodies calculated as described above.

(Formula 6)

When the relative position vector ri from the center of the rigid body when the vertex i is not rotating is initially rotated by the current amount of rotation of the rigid body using the quaternion Q, and is then moved by the center-of-gravity coordinate X of the rigid body, the current relative position vector r' of the vertex i is calculated by Eq. (22).

$$r'i = X + Qr iQ^T \quad (22)$$

The model view projection matrix M is then used to convert to the coordinate r" in the coordinate system currently being rendered, on the basis of Eq. (23).

$$r'' = Mr'i \quad (23)$$

In the calculation performed in the GPU 12, the eight stages of algorithms described above are basically repeated, whereby an image of a collision simulation of the numerous rigid bodies can be displayed in real time on the display screen of the display device 15.

Figure 5:
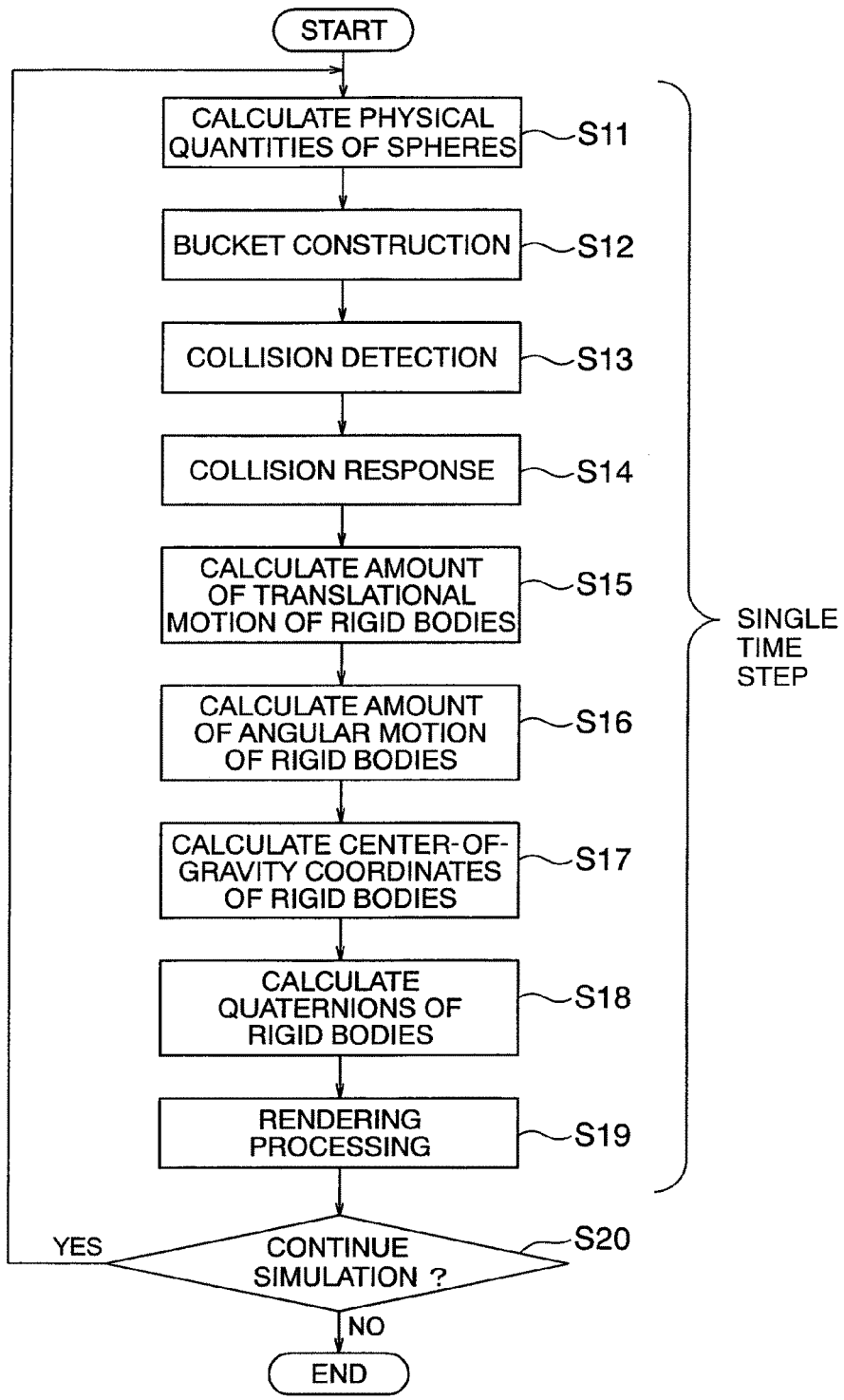
FIG. 5 is a flowchart showing the calculation algorithm of accelerating a rigid-body simulation using the GPU.
Figure 7:
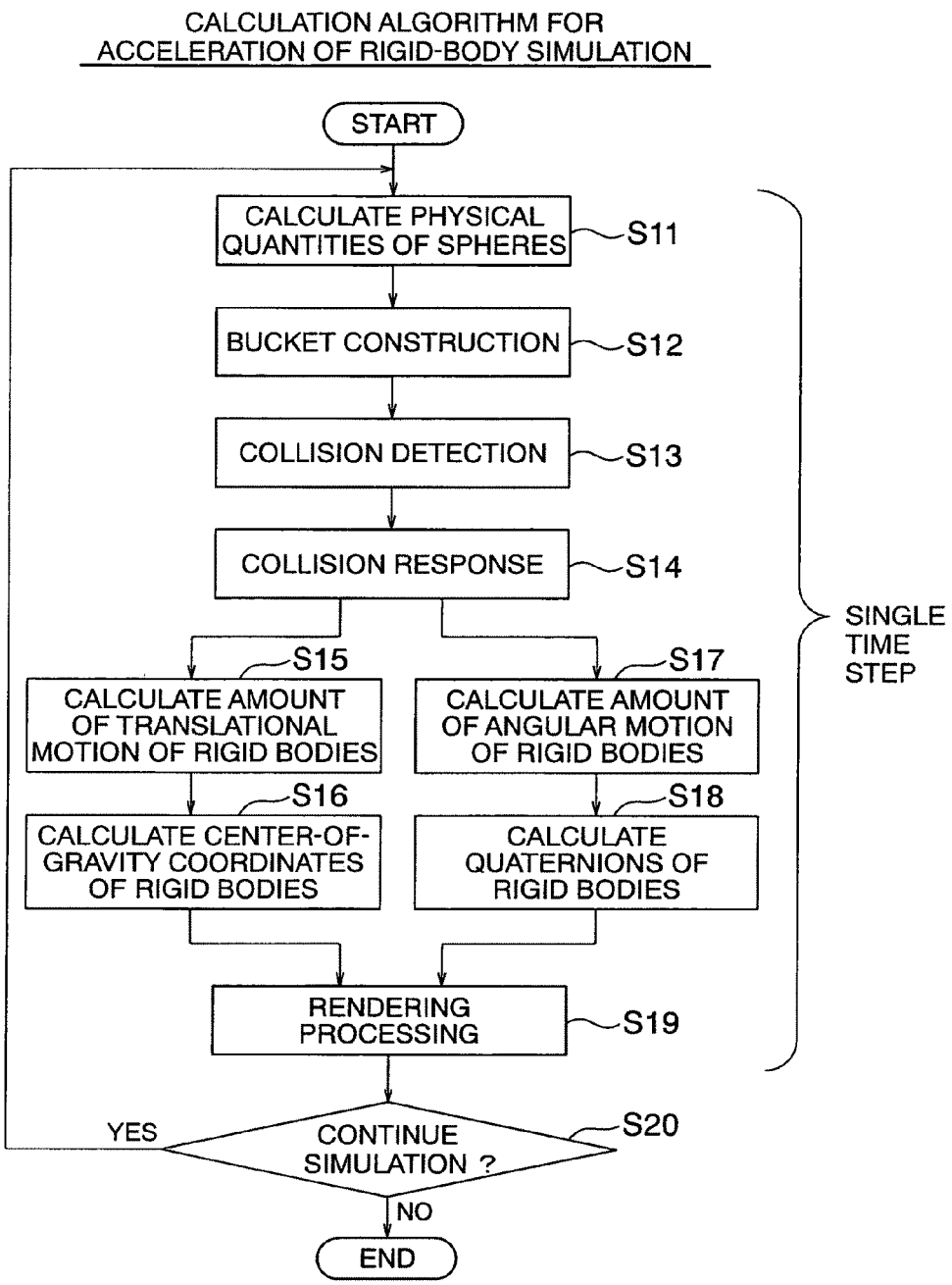
FIG. 7 is a flowchart showing a modified example of the calculation algorithm of accelerating of a rigid-body simulation using the GPU.

FIG. 7 shows a modified example of the calculation algorithm of accelerating the rigid-body simulation shown in FIG. 5. In the flow of processing shown in FIG. 7, the same reference symbols are used to indicate steps that are essentially the same as the steps shown in FIG. 5. According to the calculation algorithm shown in FIG. 7, a configuration can be adopted in which the calculation S15 of the amount of translational motion of the rigid bodies, the calculation S16 of the center-of-gravity coordinates of the rigid bodies, the calculation S17 of the amount of angular motion of the rigid bodies, and the calculation S18 of the rigid body quaternions are simultaneously executed by parallel processing. Parallel processing in the GPU 12 is utilized herein. The flow of other processing is the same as shown in FIG. 5. Through this configuration, the time in a single time step in the calculation algorithm of the rigid-body simulation can be further reduced, and even further acceleration can be achieved.

In the rigid-body simulation of falling/collisions of 10,922 tori shown in FIG. 3, the time required for a single time step was 16.6 milliseconds, and frame rate during rendering was 23 FPS. In the rigid-body simulation of falling/collisions of 16,384 chess pieces shown in FIG. 4, the time required for a single time step was 12.8 milliseconds, and frame rate during rendering was 21.2 FPS.

The physical quantity referred to as a "quaternion" was used to indicate the orientation of a rigid body in the description of the embodiment given above, but a "rotation matrix" may also be used instead of a quaternion for calculation. A "quaternion" and a "rotation matrix" are both physical quantities that indicate the "orientation of an object."

Figure 8:
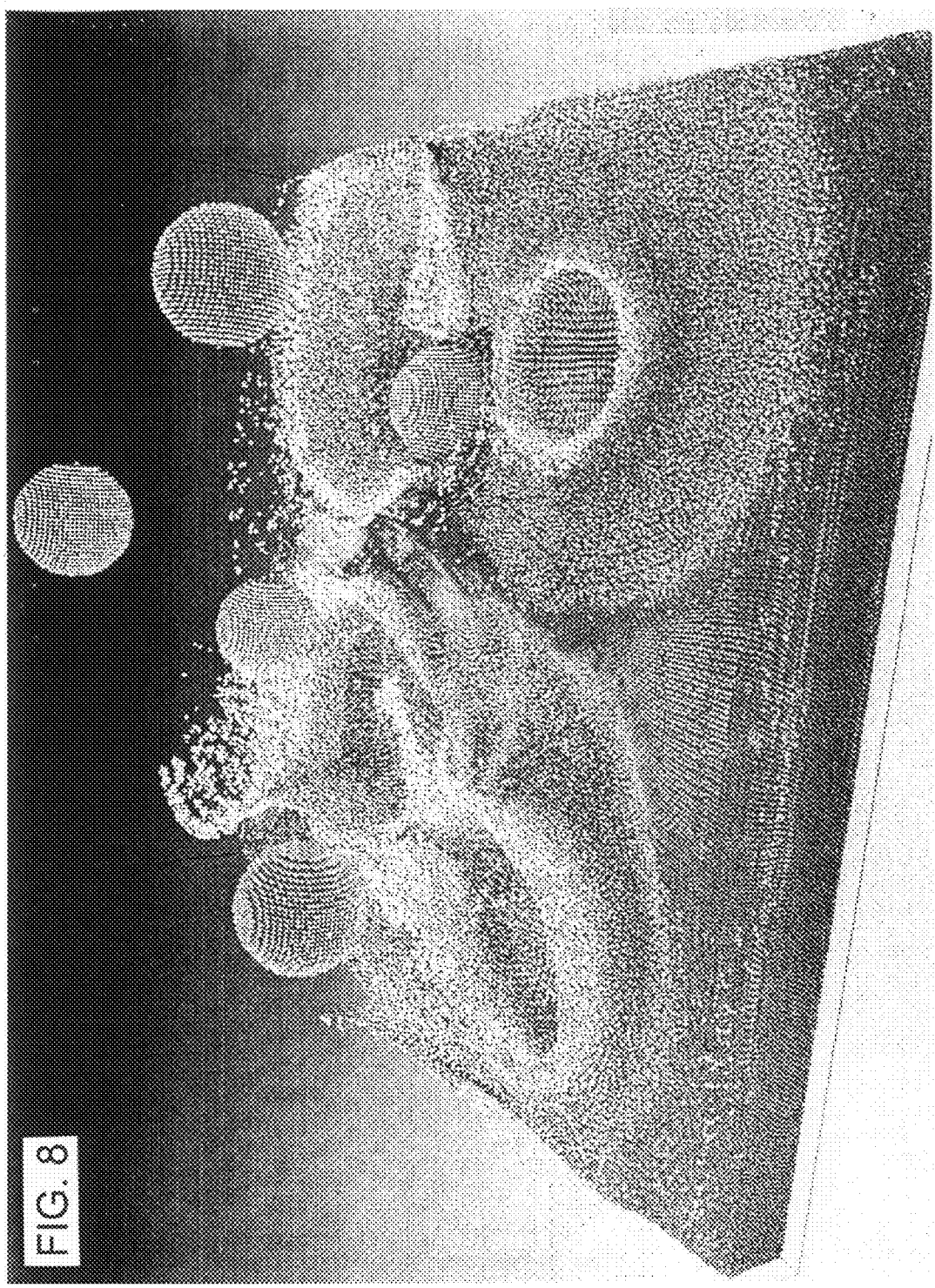
FIG. 8 is a diagram showing an effect image (CG) based on a fluid-body simulation relating to the physical phenomenon when a plurality of spherical fluid bodies falls into a fluid body.
Figure 9:
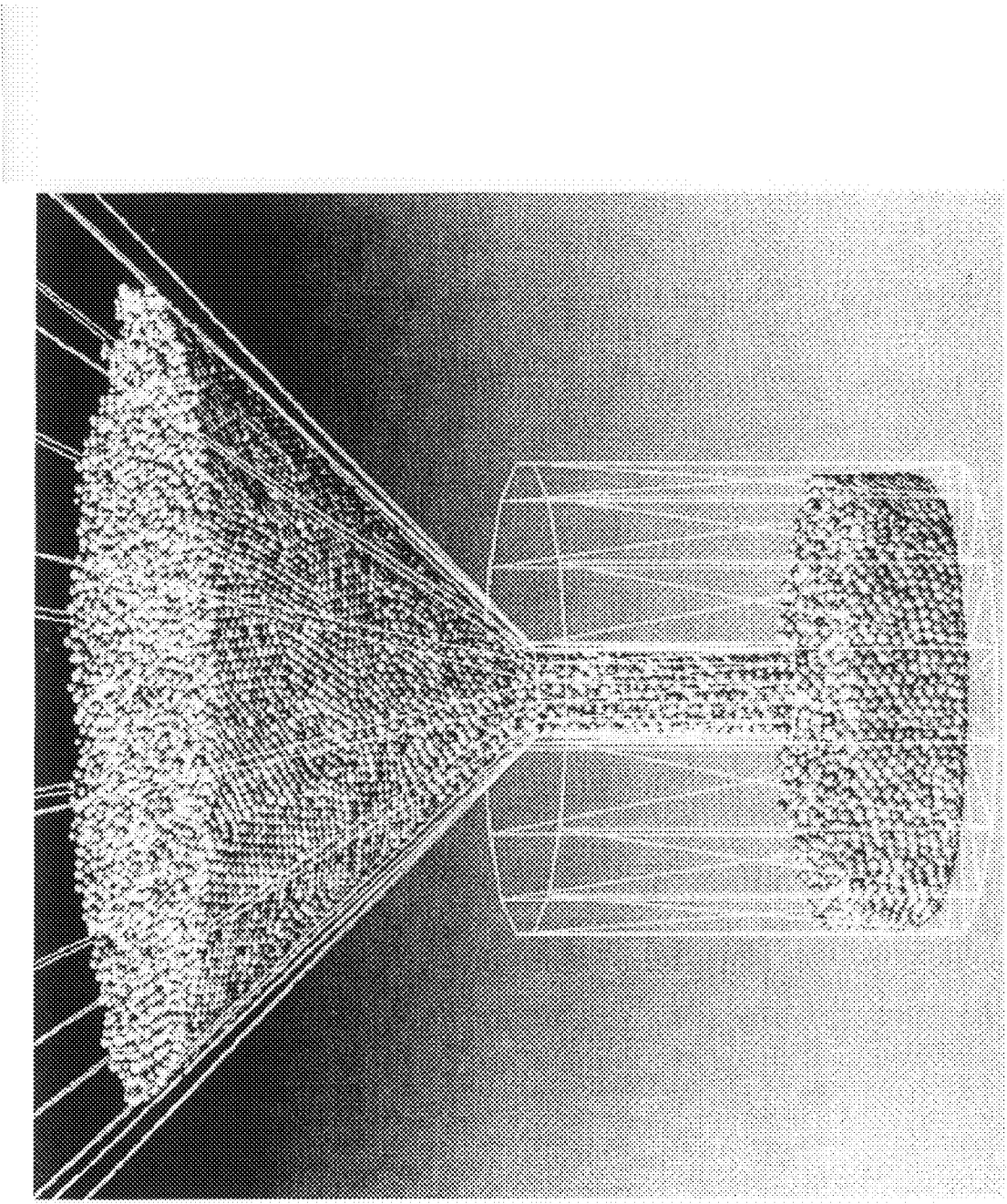
FIG. 9 is a diagram showing an effect image (CG) based on a particulate-body simulation when a particulate body contained in a funnel-shaped vessel flows downward, falls to the outside from an opening in the bottom end of the vessel, and is contained in a vessel positioned below the opening.

The method for constructing a data structure used in the proximate particle search of a particle-based simulation in the previously described embodiment was applied to a rigid-body simulation relating to collisions of numerous rigid bodies, but the method for constructing a data structure according to the present invention is not limited as such, and may also be applied to express the fluid movement of a fluid body or particulate body, or to another natural object, as shown in FIGS. 8 and 9.

FIG. 8 is a diagram showing an effect image of a simulation that shows the state of change of a fluid body when a plurality of spherical fluid bodies (drops) falls into a water or another fluid body. FIG. 9 is a diagram showing an effect image of a simulation that shows the state change when a particulate body contained in a funnel-shaped vessel flows downward, falls to the outside from an opening in the bottom end of the vessel, and is contained in a vessel positioned below the opening.

The previously described method for constructing a data structure used in a proximate particle search is implemented through execution of the proximate particle search program 13A-1 shown in FIG. 1 by the GPU 12. The proximate particle search program 13A-1 relating to the method for constructing a data structure used in a proximate particle search is stored as such in a CD-ROM or other storage medium, and can be configured as a standalone program product.

In the description of the embodiment, an example was described in which a shader (shader) was used in the mounting of the program by the GPU. However, the present invention is not limited by this configuration. For example, mounting can be performed even when another programming model is used. In the mounting of the program by the GPU, CUDA, CTM, Brook, or the like may currently be used besides the abovementioned shader. These methods are common with regard to programming language when the GPU is used as a streaming processor (Streaming Processor). In the previously described example in which a shader (Shader) was used, slices, voxels, and data relating to the particles were stored in the video memory 13B as textures 13B-1 for the sake of calculation by the GPU 12, but "arrays" are generally used instead of textures when CUDA or the like is used.

What is claimed is:

1. A method for constructing a data structure used in a proximate particle search that is used by a method executed by a stream processor (GPU: a graphics computation processor such as a graphics processing unit) for computing a simulation of a physical object by converting three-dimensional digital image data constructed from data arrays (GPU: image data) created in memory used by the processor (GPU: video memory) to two-dimensional digital image data, wherein: a technique is used for indicating the physical object as numerous particles and determining an existence state of the physical object on the basis of a storage positional relationship between the numerous particles in a three-dimensional image data structure in the memory (GPU: video memory);

a bucket array (GPU: texture) included in the three-dimensional image data structure is composed of a bucket in which a memory space created in accordance with a space in which in the physical object occurs is divided, and a particle number assigned to the numerous particles is stored in each of numerous buckets;

a writing step is provided in which a particle coordinate and the particle number of the particle stored in the bucket are read and written to an array in the memory using scattering operation of the stream processor (GPU: a two-dimensional image space using a vertex shader by the graphics computation processor); and the particle number and particle coordinate of each of the plurality of particles are written one at a time in a kernel (GPU: a rendering) for a plurality of cycles of processing in a single time step of a simulation when a plurality of the particles is present in the bucket in the writing step;

wherein selection of a written data (GPU: pixel) and a particle number of the particle written in each step (GPU: rendering) for the plurality of cycles of processing, and selection of a memory location in the memory allocated for a voxel (GPU: channel in the written pixel) are performed using functions of a counter by the stream processor (GPU: a stencil test, a color mask, and a depth test that are prepared by the graphics computation processor);

wherein a particle number is sequentially stored from particles for which particle numbers are in ascending order or descending order separately for each of memory locations (GPU: four channels composed of RGBA of a pixel) for which the particle number is written when four of said particles are present in the bucket;

writing a particle number $i_{b0}$ in the first memory location (GPU: R channel) and performing a kernel (GPU: rendering) for a first routine by initializing the counter to zero (GPU: a depth buffer at a maximum value), and accepting the first write to the first memory location (GPU: items having a smallest value using a depth test in writing to the pixel) in a first pass;

writing a particle number $i_{b1}$ in the second memory location GPU: G channel and performing a kernel (GPU: rendering) for a second routine by using the counter to prohibit writing to the first memory location (GPU: a color mask to prohibit writing to the R channel), and to write the next value to the second memory location (GPU: using a stencil test in writing to the pixel) in a second pass;

writing a particle number $i_{b2}$ in the B channel and performing rendering for a third routine by using a color mask to prohibit writing to the R and G channels, and using a stencil test in writing to the pixel in a third pass; and writing a particle number $i_{b3}$ in the A channel and performing rendering for a fourth routine by using a color mask to prohibit writing to the R, G, and B channels, and using a stencil test in writing to the pixel in a fourth pass;

the particle numbers of the four articles being $i_{b0}$, $i_{b1}$, $i_{b2}$, and $i_{b3}$ (wherein $i_{b0} < i_{b1} < i2 < i_{b3}$ when the order is ascending, and $i0 > i1 > i2 > i3$ when descending).

2. The method of claim 1, wherein the physical object is composed of numerous rigid bodies, and computation of a simulation based on collision calculation of the numerous rigid bodies is executed.

3. The method of claim 1, wherein the stream processor is a GPU.

4. A program for constructing a data structure used in a proximate particle search that is used by a program executed by a stream processor for computing a simulation of a physical object by converting three-dimensional digital image data constructed from an array (GPU: image data) created in (GPU: video) memory to two-dimensional digital image data, wherein the program causes the graphics computation processor to execute routines comprising:

indicating the physical object as numerous particles, and determining an existence state of the physical object on the basis of a storage positional relationship between the numerous particles in a three-dimensional image data structure in the (GPU: video) memory; causing a bucket texture included in the three-dimensional image data structure to be composed of a bucket in which a memory space created in accordance with a space in which the physical object occurs is divided, and a particle number assigned to the numerous particles to be stored in each of numerous buckets; performing a writing routine of using a scattering function (GPU: vertex shader) to read a particle coordinate and a particle number of the particle stored in the bucket and write the particle coordinate and the particle number to a two-dimensional image space; wherein writing the particle number and particle coordinate of each of the plurality of particles one at a time in a processing (GPU: rendering) for a plurality of cycles of processing in a single time step of a simulation when a plurality of the particles is present in the bucket in the writing step in the writing routine;

wherein selection of a written pixel and a particle number of the particle written in each processing (GPU: rendering) for the plurality of cycles of processing, and selection of a memory location of the memory for the voxel (GPU: channel in the written pixel) are performed using functions of a counter by the stream processor (GPU: stencil test, a color mask, and a depth test that are prepared by the graphics computation processor);

wherein the stream processor (GPU: graphics computation processor) is caused to execute a routine of sequentially storing a particle number from particles for which particle numbers are in ascending order or descending order separately for each of four memory locations (GPU: channels composed of RGBA of a pixel) for which the particle number is written when four of said particles are present in the bucket;

wherein the program causes the stream processor (GPU: graphics computation processor) to execute routines comprising: writing a particle number $i_{b0}$ in the first memory location (GPU: R channel) and performing a operation (GPU: rendering) for a first routine by initializing a counter to zero (GPU: a depth buffer at a maximum value), and accepting the first write to the first memory location (GPU: items having a smallest value using a depth test in writing to the pixel) in a first pass;

writing a particle number $i_{b1}$ in the G channel and performing rendering for a second routine by using a color mask to prohibit writing to the R channel, and using a stencil test in writing to the pixel in a second pass; writing a particle number $i_{b2}$ in the B channel and performing rendering for a third routine by using a color mask to prohibit writing to the R and G channels, and using a stencil test in writing to the pixel in a third pass; and writing a particle number $i_{b3}$ in the A channel and performing rendering for a fourth routine by using a color mask to prohibit writing to the R, G, and B channels, and using a stencil test in writing to the pixel in a third pass;

the particle numbers of the four particles being $i_{b0}$, $i_{b1}$, $i_{b2}$ and $i_{b3}$ (wherein $i_{b0} < i_{b1} < i_{b2} < i_{b3}$).

5. The program for constructing a data structure used in a proximate particle search according to claim 4, wherein the physical object is numerous rigid bodies, and computation of a simulation based on collision calculation of the numerous rigid bodies is executed by the graphics computation processor.

6. The program of claim 4, wherein the graphics computation processor is a GPU or a streaming processor.

7. A computer-readable storage medium for storing the program for constructing a data structure used in a proximate particle search according to claim 4.

* * * * *